3,660,525
GRAFT COPOLYMER OF EPOXY MONOMER ONTO A RUBBER POLYMER LATEX AND A VINYL CHLORIDE RESIN
Testuyo Kawahara, Yokosuka, Japan, assignor to The Japanese Geon Company Ltd., Tokyo, Japan
No Drawing. Filed Sept. 24, 1970, Ser. No. 75,297
Claims priority, application Japan, Sept. 26, 1969, 44/76,198, 44/76,199; June 20, 1970, 45/62,768, 45/62,769
Int. Cl. C08g 45/04
U.S. Cl. 260—836     17 Claims

ABSTRACT OF THE DISCLOSURE

A graft copolymer obtained by polymerizing 50–150 parts by weight of monomeric mixture consisting of 95–15 weight of an aromatic vinyl compound, 0–35 weight percent of a vinyl cyanide compound and 0–80 weight percent of a methacrylic ester, along with 0.01–10 parts by weight of an unsaturated olefinic compound having a three-membered epoxy group, in the presence of 100 parts by weight of a diene type rubbery polymer latex (as the rubber portion).

---

This invention relates to a graft copolymer which is useful for the reinforcement of vinyl chloride resins. More specifically, the invention relates to a graft copolymer which is obtained by polymerizing an aromatic vinyl compound, a vinyl cyanide compound and/or a methacrylic ester, and an unsaturated olefinic compound having a three-membered epoxy group, in the presence of a diene type rubbery polymer.

In view of its possession of excellent chemical and physical properties, the vinyl chloride resin finds wide use as a thermoplastic molding composition, but there is the drawback that it is inferior in its impact strength. As a method of improving the impact strength of the vinyl chloride resin, it is well known to incorporate either an acrylonitrile-butadiene copolymer, an acrylonitrile-butadiene-styrene copolymer or a methyl methacrylate-butadine-styrene copolymer in the vinyl chloride resin as an impact resisting assistant.

However, when the extrusion or injection molding process is carried out using a vinyl chloride resin composition which has been incorporated with these conventional impact resisting assistants, the impact resisting assistant in the composition orients along the flow of the molten resin, with the consequence that there is demonstrated a pronounced anisotropy of the impact strength of the molded product between that in which the test piece was prepared in parallel to the flow and that in which the test piece was prepared at right angles to the flow (the former being greatly inferior in its strength). This pronounced anisotropy of the impact strength is frequently experienced, it being seen in the phenomenon that contrary to one's expectation an improvement is not had in the strength of the molded product in spite of the use of an impact resisting assistant.

Accordingly, the object of the present invention is to provide an impact resisting assistant which when incorporated in the vinyl chloride resins yields a composition which not only excels in thermal stability and processability but also has a satisfactory transparency and an excellent impact strength whose anisotropic dependence is small.

I found that a graft copolymer meeting the foregoing object of the present invention could be formed by adding to the system a small amount of an unsaturated olefinic compound having a three-membered epoxy group when polymerizing an aromatic vinyl compound and a vinyl cyanide compound and/or a methacrylic ester in the presence of a diene type rubbery copolymer. Thus, the graft copolymer of the invention is obtained by polymerizing 50–150 parts by weight of a monomeric mixture [I] consisting of 95–15 weight percent of an aromatic vinyl compound, 0–35 weight percent of a vinyl cyanide compound and 0–80 weight percent of a methacrylic ester with 0.01–10 parts by weight of an unsaturated olefinic compound having a three-membered epoxy group [II] in the presence of 100 parts by weight of a diene type rubbery copolymer. When 2–50 weight percent of this graft copolymer is incorporated in 98–50 weight percent of a vinyl chloride resin, a vinyl chloride resin composition is provided, which not only excels in thermal stability and processability but also has a satisfactory transparency and an excellent impact strength whose anisotropic dependence is small.

The diene type rubbery polymer used for obtaining the invention graft copolymer is preferably either a homopolymer of butadiene or isoprene or a copolymer of the two, or a rubbery copolymer of these diene type monomers with an olefinic compound copolymerizable therewith. These rubbery copolymers are polymerized by the conventional emulsion polymerization method, using as catalyst the known water- and oil-soluble peroxides, azo compounds and redox catalysts. As the emulsifying agent, the known alkali metal salts of rosin acid, alkylsulfonic acids or fatty acids are used. Also, a polymerization regulator may be used, if necessary. The resulting rubbery copolymer is conveniently used in the latex form. In this case, no particular restrictions are imposed on the particle size of the rubbery copolymer, but usually a particle diameter of less than 2000A. is preferred. An increase in the impact strength of the composition takes place as the particle size becomes greater but, on the other hand, when a transparent molded sheet is bent, a whitening phenomenon tends to appear. Hence, it is necesary to make a proper choice of the particle size in accordance with the intended use of the composition.

As the aromatic vinyl compound in the monomeric mixture [I], styrene, alpha-methyl styrene and vinyl toluene are useable; as the vinyl cyanide compounds, acrylonitrile and methacrylonitrile are useable; and as the methacrylic esters, methyl methacrylate and ethyl methacrylate can be used. When the total amount of these is less than 50 weight parts, the resulting graft copolymer becomes rubbery. Hence, in this case the product must be submitted to some treatment, or otherwise it will be difficult to manage it as a powder. On the other hand, if 150 weight parts are exceeded, the effect as an impact resisting assistant is reduced, and hence such a great amount is undesirable. The aromatic vinyl compounds, vinyl cyanide compounds and methacrylic esters are, as previously noted, used in a proportion of 95–15 weight percent, 0–35 weight percent and 0.80 weight percent. Particularly preferred is the use of either a binary mixture of 95–65 weight percent of an aromatic vinyl compound and 5–35 weight percent of a vinyl cyanide compound, a binary mixture of 80–20 weight percent of an aromatic vinyl compound and 20–80 weight percent of a methacrylic ester, or a ternary mixture of 75–15 weight percent of an aromatic vinyl compound, 5–35 weight percent of a vinyl cyanide compound and 20–80 weight percent of a methacrylic ester.

The monomers may be added to the reaction system in the required amounts at the beginning of the polymerization reaction or may be added to the reaction system continuously or in divided portions in concomitance with the progress of the polymerization reaction. Alternatively, one of the components of the monomeric mixture may be separately added to the system.

As the unsaturated olefinic compounds having a three-membered epoxy group, mention can be made of the unsaturated alkyl glycidyl ethers such as vinyl glycidyl ether, isopropenyl glycidyl ether, allyl glycidyl ether, methallyl glycidyl ether, butenyl glycidyl ether and oleyl glycidyl ether; the unsaturated cycloalkyl glycidyl ethers, unsaturated alkyl-substituted phenyl glycidyl ethers and the derivatives thereof such as 4-vinyl cyclohexyl-glycidyl ether, cyclohexenylmethyl glycidyl ether, o-allylphenyl glycidyl ether and p-vinylbenzyl glycidyl ether; the monoepoxide compounds of the diene type monomers such as butadiene monoepoxide, chloroprene monoxide, 3,4-epoxy-1-pentene, 4,5-epoxy-1-pentene, 4,5-epoxy-2-pentene, 4,5-epoxy-1-hexene, 5,6-epoxy-1-hexene, 5,6-epoxy-2-hexene, 3,4-epoxy-1-vinylcyclohexene and divinylbenzene monoxide; and the unsaturated alkyl glycidyl esters such as glycidyl acrylate, glycidyl methacrylate, crotonic acid glycidyl ester and oleic acid glycidyl ester.

These unsaturated olefinic compounds having a three-membered epoxy group must be used in an amount of 0.01–10 weight parts, preferably 0.01–5 weight parts, and still more preferably 0.01–3 weight parts, per 100 weight parts of the rubbery polymer. The effects of the invention cannot be demonstrated when the amount is less than 0.01 weight part. On the other hand, when these compounds are used in excess of 10 weight parts, a marked improvement in the impact strength that can be expected from the use of these compounds can no longer be noted, although the anisotropy of the impact strength is reduced.

These unsaturated olefinic compounds [II] may be added to the system in the presence of the diene type rubbery polymer simultaneously with the aforesaid monomeric mixture [I], or may be added to the system at any period, i.e., during either the initial stage of the graft polymerization reaction, during the progress of the reaction or during the latter stage thereof. Alternatively, the addition may be made to the system throughout the polymerization reaction, wither continuously or intermittently in divided portions. The mode to be used is not restricted to the methods described but that deemed most convenient by those skilled in the art for practicing the invention is chosen.

In polymerizing the aforesaid monomeric mixture [I] and the unsaturated olefinic compound having a three-member epoxy group [II] in the presence of the diene type rubbery polymer, the peroxides, azo compounds and redox catalysts are used as the catalyst. If necessary, the alkali metal salts of alkylsulfonic acids, fatty acids and rosin acid may be used as an emulsifier. Further, a polymerization regulator may also be used.

When the so obtained aqueous dispersion of graft copolymer is spray-dried, its powdered form can be obtained. However, this powdered form is not desirable when this graft copolymer is to be used for compositions in which transparency and thermal stability are particularly demanded, since these properties are impaired in the case of the aforesaid powdered form. Hence, the preferred procedure is to add the aforesaid aqueous dispersion of the polymer to an aqueous solution of an inorganic salt such as calcium chloride and aluminum sulfate and an acid such as hydrochloric, sulfuric and phosphoric acids and effecting the salting out and solidification, followed by water-washing and drying.

The composition obtained by mixing the invention graft copolymer with the vinyl chloride resin is incorporated, if necessary, with a stabilizer, lubricant, plasticizer, filler, colorant, blowing agent, etc. When the vinyl chloride resin occupies 50–98 weight parts of the 100 weight parts of the composition consisting of the invention graft copolymer and the vinyl chloride resin, i.e. when the proportion of the graft copolymer is 50–2 weight parts, the intended effect of the invention graft copolymer is demonstrated.

The so obtained composition is supplied for use in the various molding processes such as roll processing and extrusion, injection and blow molding; and the so obtained molded product has a high impact strength whose anisotropic dependence is very small and moreover demonsrates excellent properties as regards its processibility and thermal stability.

Thus, when an unsaturated olefinic compound having a three-membered epoxy group is used in accordance with the invention, the anisotropy of the impact strength of the polyvinyl chloride resin composition is reduced as compared with the instance where the cross-linking compound, such as the known divinylbenzene, is used. While its functioning mechanism is not clear it is believed that whereas the known cross-linking compounds advances the cross-linking reaction in the process of effecting the graft polymerization and does not participate at all in reinforcing the interface between the graft copolymer and the polyvinyl chloride resin, in the case of the aforesaid compound of the present invention, first the unsaturated bond between the carbon-carbon participates in the graft polymerization process, and thereafter the remaining epoxy group takes part in the cross-linking reaction during the kneading and molding of the compound with the polyvinyl chloride polymer, with the consequence that this contributes to the effect of reinforcing the interface between the graft copolymer and the polyvinyl chloride polymer.

The following examples and control experiments are given for further illustration of the invention. The parts and percentile ratios in following examples are on the weight basis.

EXAMPLES 1–20

The diene type rubbery polymer was prepared in accordance with the recipe (1) shown below. The reaction was carried out at 50° C., using an agitator-equipped stainless steel reactor. A conversion of above 97% was achieved with a polymerization time of 30 hours.

The monomers shown in Table 1 were used.

Recipe (1)

| | Parts |
|---|---|
| Monomer (see Table 1) | 100 |
| Divinylbenzene | 0.5 |
| Distilled water | 200 |
| Potassium oleate | 2.5 |
| Sodium pyrophosphate | 0.3 |
| t-Dodecyl mercaptan | 0.2 |
| Potassium persulfate | 0.3 |

TABLE 1

| | Monomeric composition (percent) | |
|---|---|---|
| | Butadiene | Styrene |
| Polymer: | | |
| a | 100 | 0 |
| b | 75 | 25 |

An agitator-equipped pressure reactor was charged with 100 parts (solids portion) of the laticiferous rubbery polymer [a] obtained with the aforesaid recipe (1), 300 parts of distilled water, 40 parts of methyl methacrylate, 20 parts of styrene, 0.3 part of glycidyl methacrylate, 0.5 part of potassium oleate and 0.1 part of potassium persulfate, and the polymerization reaction was carried out at 60 C. under an atmosphere of nitrogen. The reaction was completed in 5 hours (Example 1). The so obtained product is designated A1.

Further, for determining the effects obtained when the sequence in which the monomers to be grafted and the amounts added thereof were varied, polymerization reactions were carried out using the rubbery polymer obtained with recipe (1) and by adding the monomeric compositions indicated in Table 2 in the manner indicated therein (Examples 2–20, Examples 13–20 being controls, however). The products of Examples 2–12 are designated graft copolymers A–2—A–12, while the products of Examples 13–20 are designated graft copolymers A'–1—A'–8.

In the case where the graft polymerization reaction was carried out in two stages, it was only after the first-added graft monomer was confirmed to be polymerized to at least 95% that the second graft monomer was added and the polymerization reaction was completed.

molten resin flow is pronounced, but the improvement of the impact strength of the test pieces cut out along the direction in parallel to the flow is not so pronounced, thus creating a state of marked inequality between the impact strengths in the two directions. It is obvious that an anisotropy of the impact strengths such as described will mean the imposition of serious restrictions in the use of such a product.

TABLE 2

| Example No. | Graft copolymer | Rubbery polymer used and parts used | Parts used of monomer grafted and method of addition | |
|---|---|---|---|---|
| | | | First stage grafting | Second stage grafting |
| 1 | A-1 | a (100) | Styrene (20), Methyl methacrylate (40), Glycidyl methacrylate (0.3) | |
| 2 | A-2 | a (100) | Styrene (20), Methyl methacrylate (40), Glycidy methacrylate (1.0) | |
| 3 | A-3 | a (100) | Styrene (30) | Methyl methacrylate (40), Glycidyl methacrylate (0.3) |
| 4 | A-4 | b (100) | Methyl methacrylate (30), Glycidyl methacrylate (0.5) | Styrene (30) |
| 5 | A-5 | b (100) | Methyl methacrylate (30), Glycidyl methacrylate (1.0) | Do. |
| 6 | A-6 | b (100) | Methyl methacrylate (30), Glycidyl methacrylate (0.15) | Styrene (30). Glycidyl methacrylate (0.15). |
| 7 | A-7 | b (100) | Methyl methacrylate (30) | Styrene (30). Glycidyl methacrylate (0.5). |
| 8 | A-8 | b (100) | do | Styrene (30). Allylglycidyl ether (1.2). |
| 9 | A-9 | b (100) | Styrene (15), Acrylonitrile (5) | Methyl methacrylate (30). Glycidyl methacrylate (0.5). |
| 10 | A-10 | b (100) | Styrene (15), Acrylonitrile (5) | Methyl methacrylate (30). Glycidyl methacrylate (1.5). |
| 11 | A-11 / A-11 | b (100) / b (100) | Styrene (15), Acrylonitrile (5), Glycidyl methacrylate (1.5) | Methyl methacrylate (30). |
| 12 | A-12 | b (100) | Styrene (15), Acrylonitrile (5) | Methyl methacrylate (30). Allyl glycidyl ether (1.5). |
| 13 | A'-1 | a (100) | Styrene (20), Methyl methacrylate (40) | |
| 14 | A'-2 | a (100) | Styrene (30) | Methyl methacrylate (40). |
| 15 | A'-3 | b (100) | Methy methacrylate (30) | Styrene (30). |
| 16 | A'-4 | b (100) | Styrene (15), Acrylonitrile (5) | Methyl methacrylate (30). |
| 17 | A'-5 | a (100) | Styrene (20), Methyl methacrylate (40), Divinylbenzene (0.5) | |
| 18 | A'-6 | b (100) | Methyl methacrylate (30), Divinylbenzene (1.0) | Styrene (30). |
| 19 | A'-7 | b (100) | Styrene (15), Acrylonitrile (5) | Methyl methacrylate (30). Ethylene glycol dimethacrylate (0.5). |
| 20 | A'-8 | b (100) | Styrene (15), Acrylonitrile (5) | Methyl methacrylate (30). Ethylene glycol dimethacrylate (1.0). |

EXAMPLES 21–41

The several laticiferous copolymers obtained in Examples 1–20 were introduced into a 1% aqueous aluminum sulfate solution and solidified, followed by filtration, water-washing and drying for 48 hours at 40–50 C. in customary manner to obtain the copolymers in powdered form, which were used as samples in the following experiments.

The several copolymer samples and a commercially available vinyl chloride resin were blended in accordance with the following recipe (2), following which the blends were made into pipes by extruding through an extruder (Nikko-Kautex Model B-3 extruder manufactured by Japan Steel Works, Ltd.) under the following conditions. After cutting and spreading the so obtained pipes and pressing them into sheets at 180° C. for 20 minutes, test pieces were cut out therefrom along a direction parallel to as well as right angles to the direction that the molten resin flowed when being extruded. The charpy impact test was conducted on these test pieces in accordance with JIS K-6745.

The results of the test are shown in Table 3. As apparent from these results, in the case of the blends which used the graft polymer obtained in accordance with the invention (Examples 21–32), the test pieces cut out along the direction parallel to the molten resin flow and those cut out along the direction at right angles thereto exhibited impact strengths which were about equal. On the other hand, in the case of the blends which used graft copolymer not in accordance with the invention, i.e., either a copolymer not containing an olefinic compound having a three-membered epoxy group or a copolymer containing the conventional cross-linking compound (Examples 33–41), the improvement of the impact strength of the test pieces cut out along the direction at right angles to the Recipe (2)

| | Parts |
|---|---|
| Vinyl chloride resin (GEON 103 EP8) | 100 |
| Graft copolymer (Table 2) | 10 |
| Dibutyl tin maleate | 3 |
| Stearic acid | 1 |

Extrusion conditions

| | |
|---|---|
| Screw diameter, mm. | 40 |
| L/D | 22 |
| Compression ratio | 2.5 |
| Rotating speed, r.p.m. | 45 |
| Die tip temperature, ° C. | 175 |

TABLE 3

| | | Impact strength (kg.-cm./cm.²) | |
|---|---|---|---|
| Example number | Graft copolymer used | Sample obtained in parallel to resin flow | Sample obtained at right angles to resin flow |
| 21 | A-1 | 10.3 | 15.7 |
| 22 | A-2 | 12.8 | 14.3 |
| 23 | A-3 | 19.5 | 23.0 |
| 24 | A-4 | 12.2 | 18.5 |
| 25 | A-5 | 14.5 | 14.8 |
| 26 | A-6 | 11.8 | 20.2 |
| 27 | A-7 | 11.7 | 18.8 |
| 28 | A-8 | 13.9 | 14.2 |
| 29 | A-9 | 13.4 | 17.6 |
| 30 | A-10 | 11.4 | 11.6 |
| 31 | A-11 | 11.9 | 12.3 |
| 32 | A-12 | 11.7 | 12.1 |
| 33 | A'-1 | 5.2 | 32.5 |
| 34 | A'-2 | 6.3 | (¹) |
| 35 | A'-3 | 6.1 | (¹) |
| 36 | A'-4 | 4.0 | 23.7 |
| 37 | A'-5 | 4.5 | (¹) |
| 38 | A'-6 | 4.9 | (¹) |
| 39 | A'-7 | 5.0 | (¹) |
| 40 | A'-8 | 5.3 | (¹) |
| 41 | Not added | 3.6 | 3.8 |

¹ Does not break.

EXAMPLES 42-50

A reactor was charged with 100 parts (solid portion) of the polybutadiene latex [a], obtained with the aforesaid recipe (1), 300 parts of distilled water and 30 parts of styrene, and purged with nitrogen. After raising the internal temperature of the reactor to 50° C., 0.1 part of cumene hydroperoxide, 0.2 part of sodium formaldehyde sulfoxylate, 0.005 part of ferrous sulfate and 0.01 part of sodium ethylenediaminetetraacetate were added as catalyst and the polymerization reaction was carried out. Then, by adding 40 parts of methyl methacrylate and glycidyl methacrylate in a varied amount (see Table 4), the graft polymerization being completed with a total reaction time of about 6 hours.

Graft copolymers obtained in this manner (A–13—A–19 and A′–9, A′–9 being a control) were blended with a commercially available vinyl chloride resin in accordance with the aforesaid recipe (2) and kneaded for 5 minutes on 175° C. rolls, followed by pressing for 10 minutes at 180° C. to prepare the sheets, which were tested for their Charpy impact strength in accordance with JIS K–6745. The results obtained are shown in Table 4.

TABLE 4

| Example number | Graft copolymer | Glycidyl methacrylate (parts) | Charpy impact strength (kg.-cm./cm.²) |
| --- | --- | --- | --- |
| 42 | A–13 | 0.1 | 15.0 |
| 43 | A–14 | 0.2 | 19.2 |
| 44 | A–15 | 0.3 | 20.7 |
| 45 | A–16 | 0.4 | 19.8 |
| 46 | A–17 | 0.5 | 17.6 |
| 47 | A–18 | 0.6 | 15.0 |
| 48 | A–19 | 0.7 | 13.7 |
| 49 | A′–9 | 0 | 10.3 |
| 50 | Not used (PVC alone). | | 3.1 |

EXAMPLES 51-56

A reactor was charged with 100 parts (solid portion) of the styrene-butadiene copolymer latex obtained with the aforesaid recipe (1), 300 parts of distilled water and 30 parts of methyl methacrylate. The polymerization reaction was then carried out using the same catalysts and additives as in Examples 42–50, and further after adding 30 parts of styrene and glycidyl methacrylate in a varied amount (see Table 5).

Using the so obtained graft copolymers (A–20—A–24 and A′–10, A′–10 being a control) with a commercially available vinyl chloride resin, the Charpy impact test was conducted with the same recipe and operation as in Examples 42–50. The results obtained are shown in Table 5.

TABLE 5

| Example number | Graft copolymer | Glycidyl methacrylate (parts) | Charpy impact strength (kg.-cm./cm.²) |
| --- | --- | --- | --- |
| 51 | A–20 | 0.1 | 15.4 |
| 52 | A–21 | 0.25 | 22.7 |
| 53 | A–22 | 0.5 | 23.0 |
| 54 | A–23 | 0.75 | 18.5 |
| 55 | A–24 | 0.95 | 14.5 |
| 56 | A′–10 | 0 | 12.3 |

EXAMPLES 57-62

Except that allyl glycidyl ether was used instead of glycidyl methacrylate, the preparation of the graft copolymers (A–25—A–29) was otherwise carried out exactly as in Examples 51–56. The Charpy impact test was conducted with the same recipe and operation as in Examples 42–50, with the results shown in Table 6.

TABLE 6

| Example number | Graft copolymer | Allyl glycidyl ether (parts) | Charpy impact strength (kg.-cm./cm.²) |
| --- | --- | --- | --- |
| 57 | A–25 | 0.02 | 16.2 |
| 58 | A–26 | 0.06 | 17.5 |
| 59 | A–27 | 0.1 | 18.0 |
| 60 | A–28 | 0.15 | 17.8 |
| 61 | A–29 | 0.30 | 16.0 |
| 62 | A′–10 | 0 | 12.3 |

I claim:

1. A vinyl chloride resin composition comprising
    (A) 98–50% by weight of a vinyl chloride resin, and
    (B) 2–50% by weight of a graft copolymer, said graft copolymer being obtained by polymerizing 50–150 parts by weight of
        (1) a monomeric mixture consisting of 95–15% by weight of an aromatic vinyl compound, 0–35% by weight of a vinyl cyanide compound and 0–80% by weight of an methacrylic ester, and
        (2) 0.01–10 parts by weight of an unsaturated olefinic compound having a three-membered epoxy group, in the presence of 100 parts by weight of a diene type rubber polymer latex.

2. The vinyl chloride resin composition of claim 1 wherein said monomeric mixture consists of 95–65% by weight of an aromatic vinyl compound and 5–35% by weight of a vinyl cyanide compound.

3. The vinyl chloride resin composition of claim 1 wherein said monomeric mixture consists of 80–20% by weight of an aromatic vinyl compound and 20–80% by weight of a methacrylic ester.

4. The vinyl chloride resin composition of claim 1 wherein said monomeric mixture consists of 75–15% by weight of an aromatic vinyl compound, 5–35% by weight of a vinyl cyanide compound and 20–80% by weight of a methacrylic ester.

5. The vinyl chloride resin composition of claim 1 wherein said diene type rubbery polymer latex is a polybutadiene latex.

6. The vinyl chloride resin composition of claim 1 wherein said diene type rubbery polymer latex is a styrene-butadiene copolymer latex.

7. The vinyl chloride resin composition of claim 1 wherein said aromatic vinyl compound is styrene.

8. The vinyl chloride resin composition of claim 1 wherein said aromatic vinyl compound is alpha-methylstyrene.

9. The vinyl chloride resin composition of claim 1 wherein said aromatic vinyl compound is vinyl toluene.

10. The vinyl chloride resin composition of claim 1 wherein said vinyl cyanide compound is acrylonitrile.

11. The vinyl chloride resin composition of claim 1 wherein said vinyl cyanide compound is methacrylonitrile.

12. The vinyl chloride resin composition of claim 1 wherein said methacrylic ester is methyl methacrylate.

13. The vinyl chloride resin composition of claim 1 wherein said methacrylic ester is ethyl methacrylate.

14. The vinyl chloride resin composition of claim 1 wherein said unsaturated olefinic compound is glycidyl methacrylate.

15. The vinyl chloride resin composition of claim 1 wherein said unsaturated olefinic compound is allyl glycidyl ether.

16. The vinyl chloride resin composition of claim 1 wherein said unsaturated olefinic compound is present in an amount of 0.01–5 parts by weight based on the weight of the graft copolymer.

17. The vinyl chloride resin composition of claim 1 wherein said unsaturated olefinic compound is present in an amount of 0.01–3 parts by weight based on the weight of the graft copolymer.

(References on following page)

References Cited

UNITED STATES PATENTS

| | | | |
|---|---|---|---|
| 3,073,798 | 1/1963 | Baer | 260—29.7 UP |
| 3,288,886 | 11/1966 | Himei | 260—880 |
| 2,802,808 | 8/1957 | Hayes | 260—29.7 UP |
| 2,908,661 | 10/1959 | Calvert | 260—29.7 UP |
| 3,018,268 | 1/1962 | Daly | 260—880 |
| 3,029,223 | 4/1962 | Hibbard | 260—880 |
| 3,118,854 | 1/1964 | Hess | 260—29.7 UP |
| 3,230,277 | 1/1966 | Schramm | 260—880 |
| 3,267,178 | 8/1966 | Lee | 260—880 |
| 3,296,339 | 1/1967 | Feuer | 260—880 |

FOREIGN PATENTS

| | | | |
|---|---|---|---|
| 42/16,408 | 9/1967 | Japan | 260—836 |
| 40/15,344 | 7/1965 | Japan | 260—887 |

PAUL LIEBERMAN, Primary Examiner

U.S. Cl. X.R.

260—29.7 UP, 876 R, 881, 884, 885, 886